US008239865B2

(12) United States Patent
Toub et al.

(10) Patent No.: US 8,239,865 B2
(45) Date of Patent: Aug. 7, 2012

(54) WAITING AND SYNCHRONIZATION OF PARALLEL TASK EXECUTIONS BASED ON TASK GROUPS AND TASK OBJECT REPRESENTATIONS

(75) Inventors: Stephen H. Toub, Seattle, WA (US); John Duffy, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1100 days.

(21) Appl. No.: 12/131,747

(22) Filed: Jun. 2, 2008

(65) Prior Publication Data

US 2009/0300630 A1 Dec. 3, 2009

(51) Int. Cl.
*G06F 9/46* (2006.01)
*G06F 9/52* (2006.01)
(52) U.S. Cl. .................................. 718/100; 718/102
(58) Field of Classification Search .................. None
See application file for complete search history.

(56) References Cited

U.S. PATENT DOCUMENTS

| 5,355,483 | A | 10/1994 | Serlet |
| 6,065,020 | A | 5/2000 | Dussud |
| 6,199,075 | B1 | 3/2001 | Ungar et al. |
| 6,430,580 | B1 | 8/2002 | Azagury et al. |
| 6,560,619 | B1 | 5/2003 | Flood et al. |
| 6,560,773 | B1 | 5/2003 | Alexander, III et al. |
| 6,681,263 | B1 | 1/2004 | King |
| 7,197,521 | B2 | 3/2007 | Subramoney et al. |
| 7,249,352 | B2 | 7/2007 | Fleming et al. |
| 7,310,655 | B2 | 12/2007 | Dussud |
| 2005/0033781 | A1 | 2/2005 | Dussud |
| 2007/0255909 | A1 | 11/2007 | Gschwind et al. |
| 2008/0201721 | A1* | 8/2008 | Little et al. .................... 718/106 |
| 2009/0064166 | A1* | 3/2009 | Arimilli et al. ................ 718/105 |

OTHER PUBLICATIONS

Cheng, et al. "A Parallel, Real-Time Garbage Collector", ACM SIGPLAN Notices, Date: May 2001, pp. 125-136, vol. 36, Issue: 5, ACM Press New York, NY, USA.
Goh, et al. "A Real-Time Garbage Collector for Embedded Applications in CLI", Virtual Machine Research and Technology Symposium 2004, 2 Pages.
Herlihy, et al. "Lock-Free Garbage Collection for Multiprocessors", ACM SPAA, 1991, pp. 229-236.

\* cited by examiner

*Primary Examiner* — Meng An
*Assistant Examiner* — Benjamin Wu

(57) ABSTRACT

A method includes creating a first task group. A plurality of task object representations are added to the first task group. Each representation corresponds to one task object in a first plurality of task objects. A wait operation is performed on the first task group that waits for at least one of the task objects in the first plurality of task objects to complete.

17 Claims, 6 Drawing Sheets

WAITING AND SYNCHRONIZATION OF PARALLEL TASK EXECUTIONS BASED ON TASK GROUPS AND TASK OBJECT REPRESENTATIONS

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One form of parallelism is referred to as task parallelism, in which a set of operations or tasks are divided among multiple processors in a multi-processor system for execution in parallel. The operations or tasks are represented by task objects.

In one embodiment, a task group is created. A plurality of task object representations, such as references to task objects, are added to the task group. Each representation corresponds to a task object. A first one of the representations is removed from the task group after completion of a task object corresponding to the first representation. A wait operation is performed on the task group.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

Figure 1:
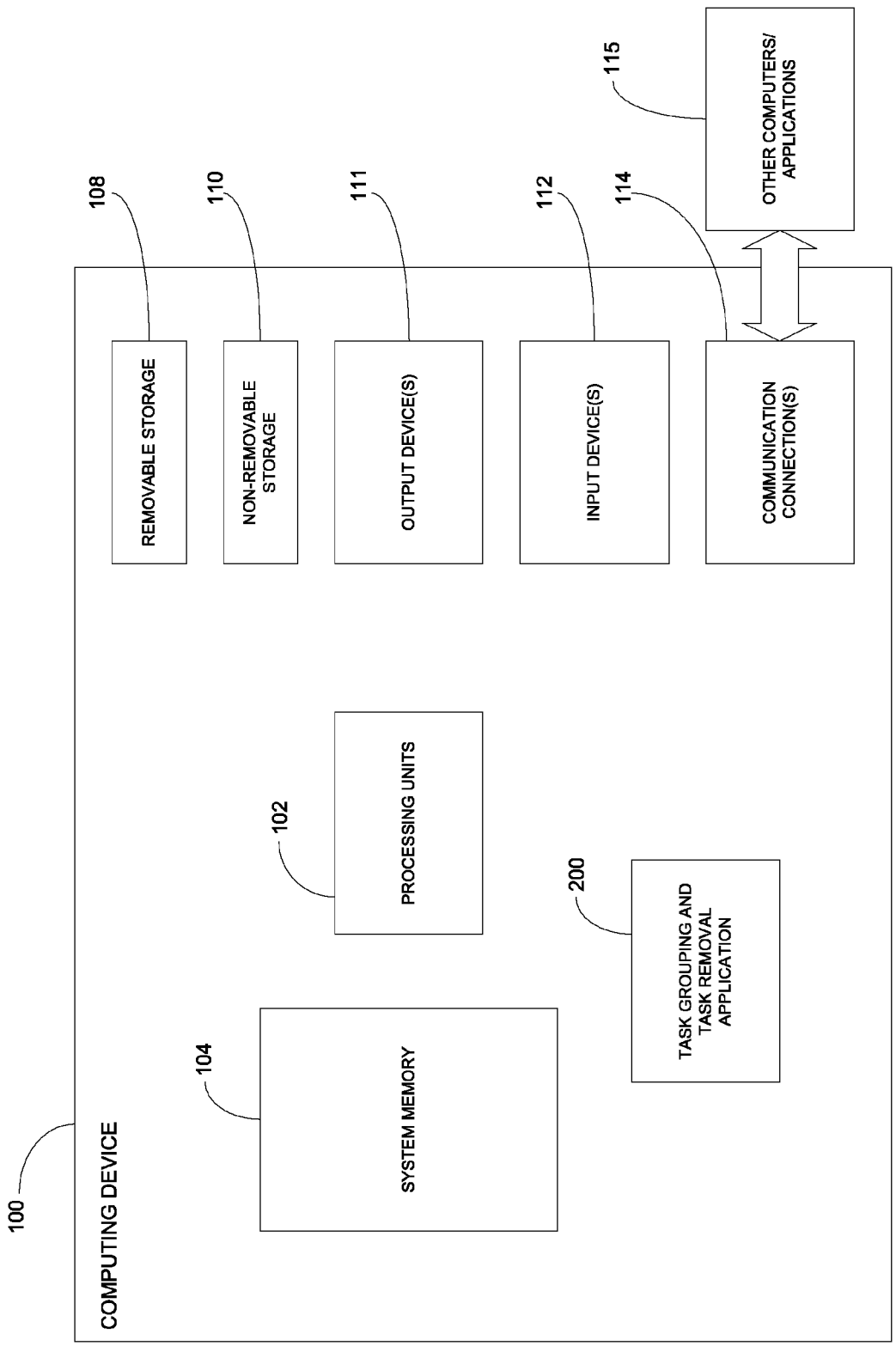
FIG. 1 is a diagram illustrating a computing device suitable for performing task grouping and task removal according to one embodiment.

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that performs task grouping and task removal for a multi-processor system, but the technologies and techniques described herein also serve other purposes in addition to these. In one implementation, one or more of the techniques described herein can be implemented as features within a framework program such as MICROSOFT®.NET Framework, or within any other type of program or service that handles parallel operations in programs.

Data parallel systems typically operate by partitioning input data into disjoint subsets (partitions) so that independent tasks of execution may process the separate subsets in isolation. The partitions may be processed in parallel by multiple processors to generate a plurality of output sets (e.g., a query is executed in parallel using the plurality of partitions). The output sets are merged back into a merged output set. The execution of the same query by multiple processors operating in parallel on different partitions of data may be referred to as data parallelism, since the input data is being divided among the processors. Another form of parallelism is referred to as task parallelism, in which a set of different operations or tasks are divided among the processors in a multi-processor system for execution in parallel.

In order to scale well as hardware performance gains are obtained through increased processor counts, applications can decompose available work into a large number of asynchronous operations or tasks. In the Parallel Extensions to the MICROSOFT®.NET Framework, an asynchronous operation is represented by a task object. Launching an asynchronous operation produces an instance of a task object that can be stored and waited on as an individual entity, meaning that a thread of execution can block (i.e., pause processing) until the target asynchronous operation represented by that task object completes execution. Multiple tasks can also be waited on by passing to a wait method references to all of the relevant task instances. This approach, however, can quickly become unmanageable if a large number of asynchronous operations are being started, resulting in a large number of task objects. The term "task object" as used herein is not intended to be limited to the MICROSOFT®.NET Framework, but rather is intended to cover in one embodiment any representation of an asynchronous operation or task in a parallel processing system.

In systems where tasks are represented by objects, a large number of tasks can translate into significant memory consumption. Garbage collected systems largely eliminate this problem if references to task objects are released, but it is typically the case that an entity waits for tasks to complete, which frequently means holding onto these object references in order to use their wait functionality, and holding onto the objects results in them not being garbage collected. This all translates into a system waiting on tasks that consume a significant amount of memory resources, which can lead to performance problems. One embodiment solves this problem by allowing tasks to be waited on yet still allowing the relevant task objects to be released from memory.

In one embodiment, task objects are each associated with one or more task groups (also referred to as containers), and the task groups are made aware of the completion of each task associated with that task group. In one embodiment, upon completion of a task, the task object automatically removes itself from all of its associated task groups. Any task objects that complete due to failure are protected from removal in one embodiment in order to allow exception information from those tasks to be propagated out of a future wait request. In one embodiment, at least one completed task object that can be used to satisfy future requests to wait for "any" task to complete is protected from removal.

FIG. 1 is a diagram illustrating a multi-processor computing device 100 suitable for performing task grouping and task removal according to one embodiment. In the illustrated embodiment, the computing system or computing device 100 includes a plurality of processing units (i.e., processors or threads) 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes task grouping and task removal application 200. Task grouping and task removal application 200 is described in further detail below with reference to FIG. 2.

Figure 2:
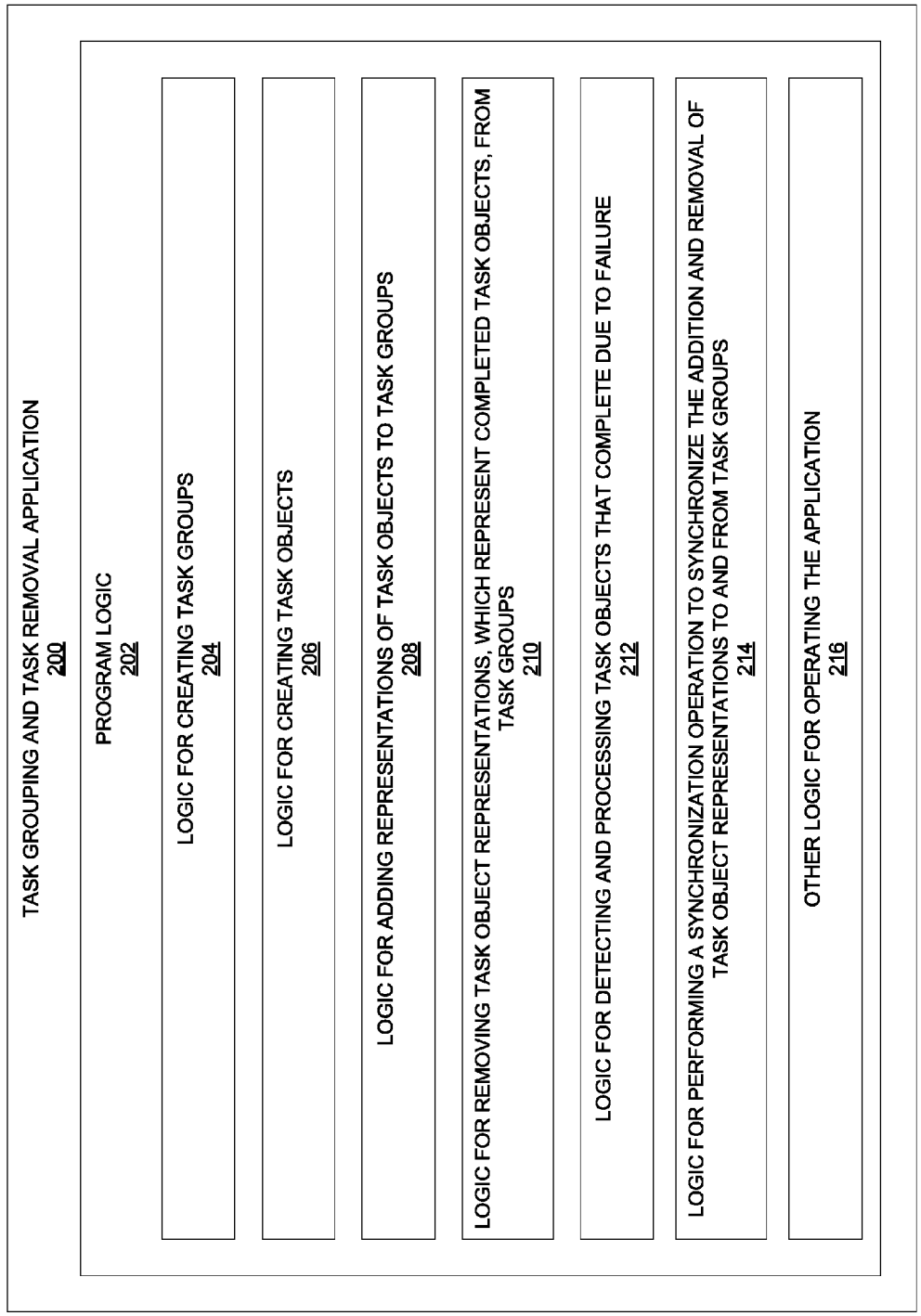
FIG. 2 is a diagrammatic view of one embodiment of a task grouping and task removal application for operation on the computing device illustrated in FIG. 1.

FIG. 2 is a diagrammatic view of one embodiment of a task grouping and task removal application 200 for operation on the computing device 100 illustrated in FIG. 1. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Task grouping and task removal application 200 includes program logic 202, which is responsible for carrying out some or all of the techniques described herein. Program logic 202 includes logic 204 for creating task groups; logic 206 for creating task objects; logic 208 for adding representations of task objects to task groups; logic 210 for removing task object representations, which represent completed task objects, from task groups; logic 212 for detecting and processing task objects that complete due to failure; logic 214 for performing a synchronization operation to synchronize the addition and removal of task object representations to and from task groups; and other logic 216 for operating the application.

Turning now to FIGS. 3-6, methods for implementing one or more embodiments of task grouping and task removal application 200 are described in further detail. In some implementations, the methods illustrated in FIGS. 3-6 are at least partially implemented in the operating logic of computing device 100.

Figure 3:
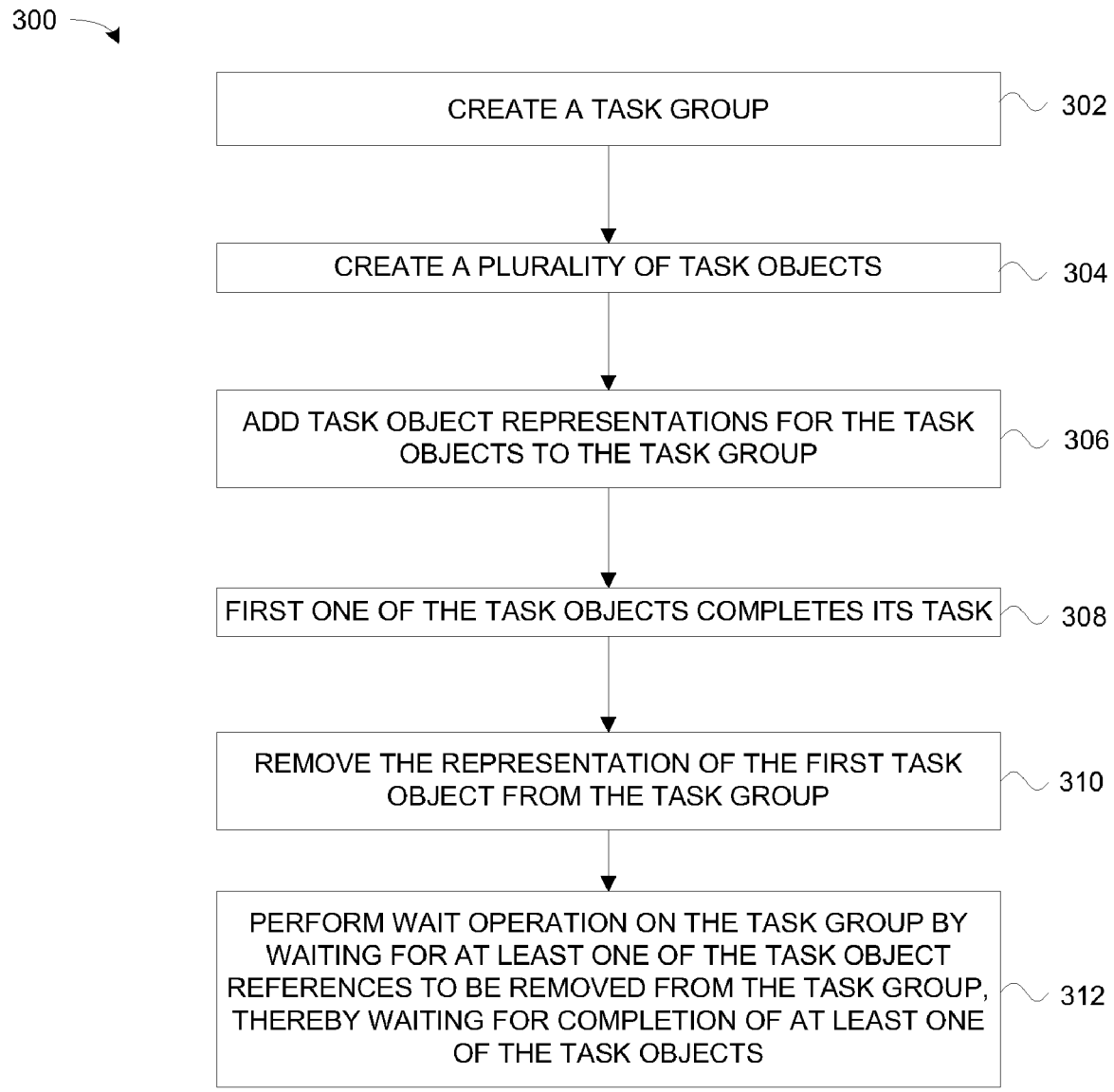
FIG. 3 is a flow diagram illustrating a method for grouping tasks and removing tasks and waiting for task completion according to one embodiment.

FIG. 3 is a flow diagram illustrating a method 300 for grouping tasks and removing tasks and waiting for task completion according to one embodiment. At 302 in method 300, a task group is created. In one embodiment, the task group created at 302 is a custom collection, such as a global array, that supports the addition of task object representations (e.g., references to task objects or task objects themselves), and supports waiting for "any" or waiting for "all" of the task objects for which it includes references to complete. At 304, a plurality of task objects are created. In one embodiment, the task objects created at 304 represent asynchronous operations that are to be executed in a parallel manner by a plurality of processors. The task objects created at 304 may be independent task objects that are created by separate entities, or one or more of the task objects may be child task objects that are created by a parent task object. At 306, task object representations for the task objects created at 304 are added to the task group created at 302. In one embodiment, each task object that is created at 306 is configured to add a reference for itself to the task group. At 308, a first one of the task objects created at 304 completes its task.

At 310 in method 300, the representation for the first task object is removed from the task group created at 302. In one embodiment, representations are removed from the task group based on completion of the task objects. In one embodiment, the removal at 310 is performed by a timer or a daemon thread that periodically wakes up and scans the task group for references to completed task objects, and removes any such references that it finds. In another embodiment, adding a reference for a task object to the task group at 306 registers a completion event with the task object that will remove the task object reference from the task group upon completion. In one embodiment, if the task object is completed by the time its reference is added to the task group at 306, the completion event is raised immediately. In another embodiment, attempting to add a reference for a completed task object to the task group results in nothing happening (i.e., the reference for the completed task object is not added to the task group). Note that both of these approaches allow for a task object to be associated with multiple task groups, and for the task object's completion to trigger the removal of its reference from all associated task groups.

At 312, a wait operation is performed on the task group created at 302 by waiting for at least one of the task object references to be removed from the task group, thereby waiting for completion of at least one of the task objects. In one embodiment, the wait operation performed at 312 is a "wait for all" operation that waits for all of the task objects represented in the task group to complete their tasks. By adding a layer of abstraction and waiting on the task group and performing the wait based on the removal of representations from the task group, as opposed to iterating through a list of individual task objects, accessing each individual task object, and performing a wait operation for each task object, method 300 provides the ability to remove completed task objects from memory while still being able to wait on the removed task objects, without accessing the task objects themselves. In one embodiment, the wait operation is assumed to be successful for all task objects that have been removed from the task group (i.e., the fact that a reference to a task object is no longer stored in the task group implicitly means that the task object has already completed). For the case in which all task objects represented in the task group have completed, there will be no waiting since all of the task object representations will have been removed at 310 due to completion, and the task group will be empty. Similarly, waiting on a group often task objects, five of which have been removed at 310 due to completion, will result in waiting on those remaining five task objects to complete (as opposed to the original group of ten task objects). This automatic removal of representations of completed task objects according to one embodiment allows waiting on an arbitrarily large number of task objects, while only consuming memory associated with one small object (i.e., that of the task group itself). In another embodiment, the wait operation performed at 312 is a "wait for any" operation that waits for any one of the tasks objects represented in the task group to complete its task.

Figure 4:
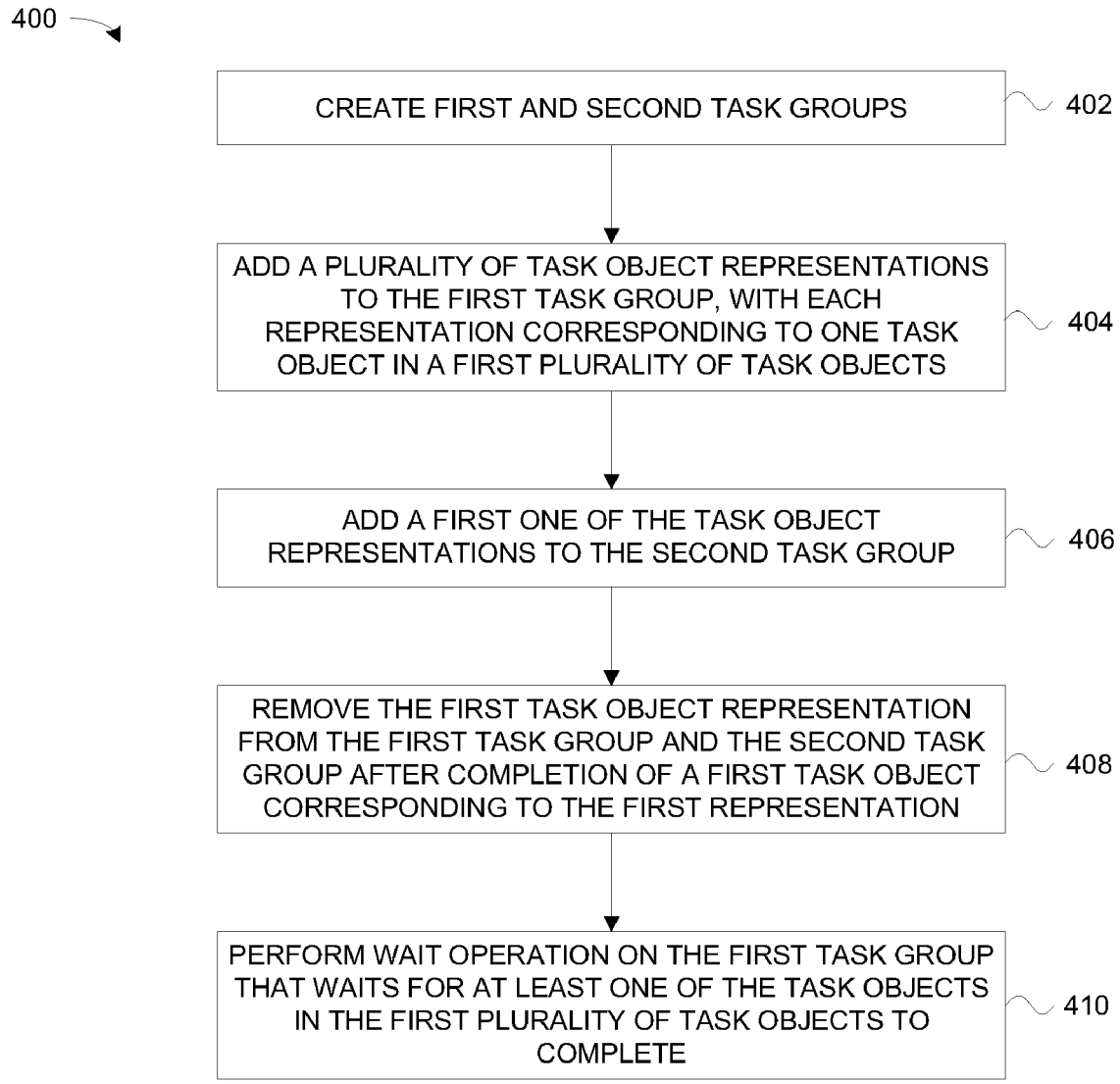
FIG. 4 is a flow diagram illustrating a method for grouping tasks and removing tasks and waiting for task completion according to another embodiment.

FIG. 4 is a flow diagram illustrating a method 400 for grouping tasks and removing tasks and waiting for task completion according to another embodiment. At 402 in method 400, a first task group and a second task group are created. At 404, a plurality of task object representations are added to the first task group, with each representation corresponding to one task object in a first plurality of task objects. At 406, a first one of the task object representations that was added to the first task group is also added to the second task group. At 408, the first representation is removed from the first task group and the second task group after completion of a first task object corresponding to the first representation. At 410, a wait operation is performed on the first task group that waits for at least one of the task objects in the first plurality of task objects to complete. In one embodiment, the wait operation at 410 waits for all task objects in the first plurality of task objects to complete. In another embodiment, the wait operation at 410 waits for any task object in the first plurality of task objects to complete.

In one embodiment of method 400, the first task group is associated with a first processor in a multi-processor system, and the first processor is configured to execute all of the task objects represented in the first task group, and the second task group is associated with a second processor in the multi-processor system, and the second processor is configured to execute all of the task objects represented in the second task group. In one form of this embodiment, a second plurality of task objects are created, and the second processor is configured to execute the second plurality of task objects. A task object representation for each task object in the second plurality of task objects is added to the second task group.

In another embodiment, the first task group in method 400 is associated with a plurality of processors in a multi-processor system, and each of the processors is configured to execute a subset of the first plurality of task objects. In one form of this embodiment, a synchronization operation is performed to synchronize the addition and removal of task object representations to and from the first task group by the plurality of processors.

Figure 5:
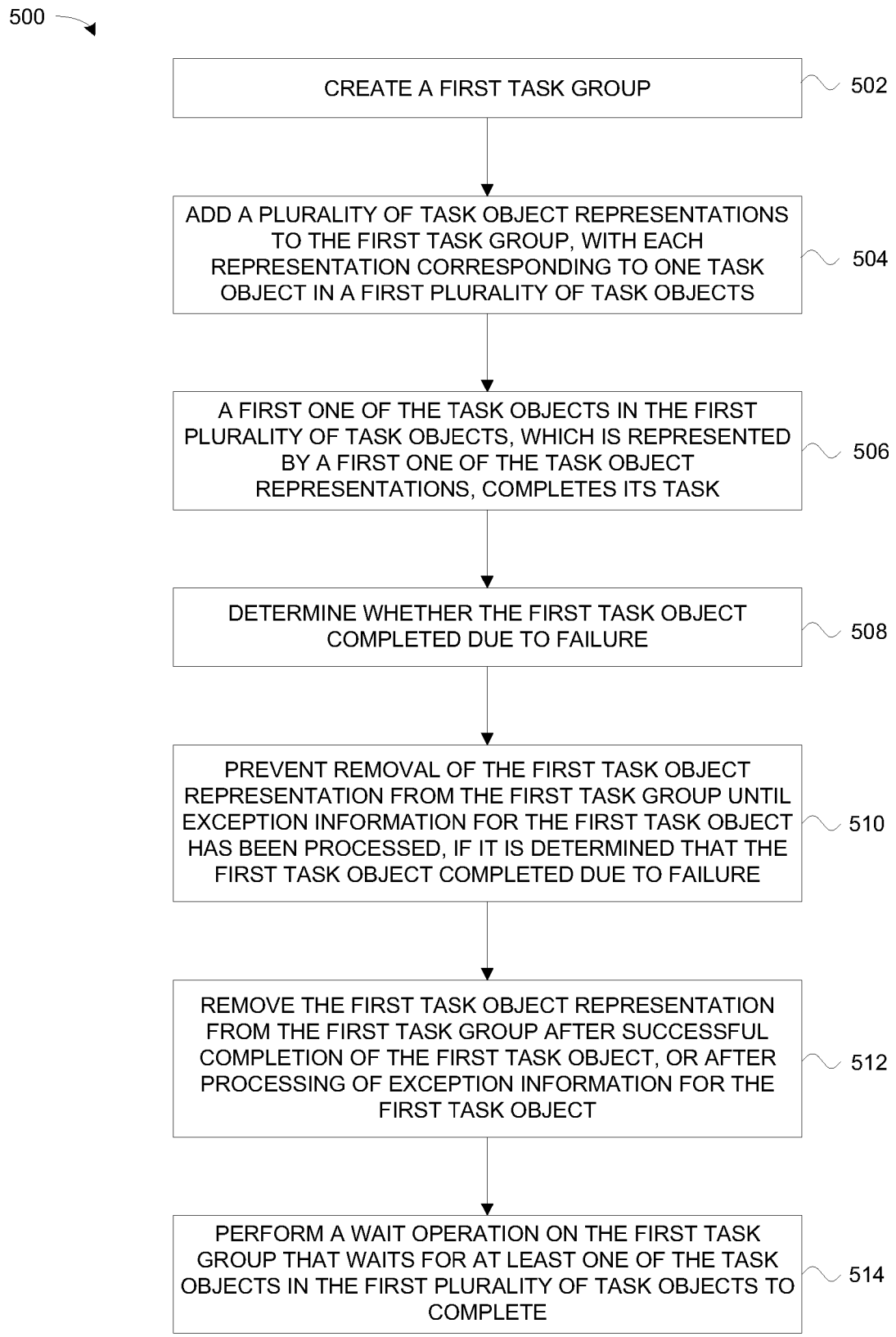
FIG. 5 is a flow diagram illustrating a method for grouping tasks and removing tasks and waiting for task completion according to another embodiment.

FIG. 5 is a flow diagram illustrating a method 500 for grouping tasks and removing tasks and waiting for task completion according to another embodiment. At 502 in method 500, a first task group is created. At 504, a plurality of task object representations are added to the first task group, with each representation corresponding to one task object in a first plurality of task objects. At 506, a first one of the task objects in the first plurality of task objects, which is represented by a first one of the task object representations, completes its task. At 508, it is determined whether the first task object completed due to failure. At 510, the system prevents removal of the first representation from the first task group until exception information for the first task object has been processed, if it is determined at 508 that the first task object completed due to failure. At 512, the first representation is removed from the first task group after successful completion of the first task object, or after processing of exception information for the first task object. At 514, a wait operation is performed on the first task group that waits for at least one of the task objects in the first plurality of task objects to complete.

Figure 6:
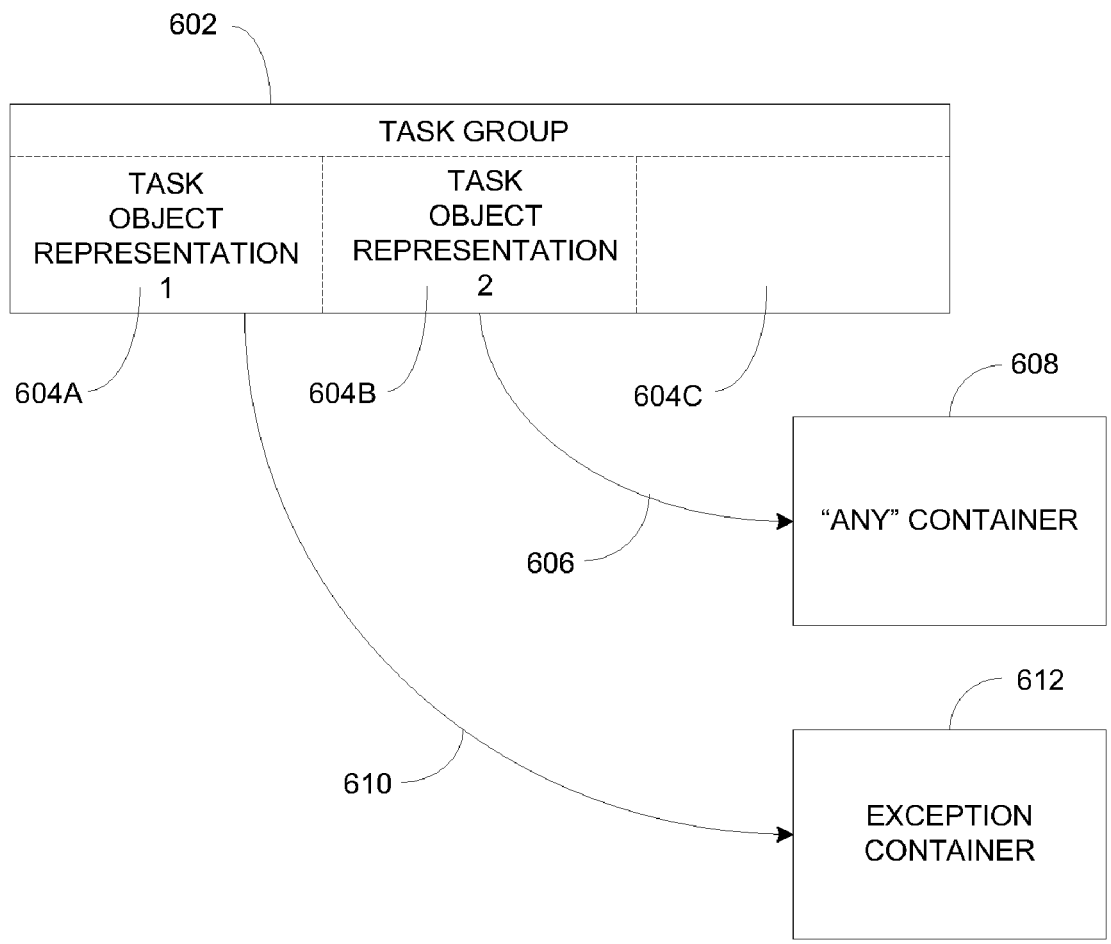
FIG. 6 is a diagram illustrating a method for removing task object representations from a task group and waiting for task completion according to one embodiment.

FIG. 6 is a diagram illustrating a method for removing task object representations from a task group and waiting for task completion according to one embodiment. As shown in FIG. 6, a task group 602 includes a plurality of slots 604A-604C (collectively referred to as slots 604) for storing task object representations. In the illustrated embodiment, slot 604A stores a first representation (Task Object Representation 1), slot 604B stores a second representation (Task Object Representation 2), and slot 604C is empty. In one embodiment, each slot 604 corresponds to one task object, and stores information related to that task object, such as a reference to the task object. In one embodiment, each time a task object is created, the created task object stores a reference for itself in a slot 604 in the task group 602. Likewise, each time that a task object successfully completes its corresponding task, the completed task object removes the reference for itself from the task group 602.

In one embodiment, when a task object successfully completes its corresponding task (e.g., the first task object to complete its task), in addition to being removed from the task group 602, the representation for that task object is written by the task object to an ANY container 608, which is used to satisfy a "wait-for-any" operation. In one embodiment, the ANY container 608 is configured to store one task object representation. When a wait-for-any operation is performed in one embodiment, the operation checks the ANY container 608 to see if there is a task object representation stored therein. If there is a representation stored in the ANY container 608, the representation is returned to identify the task object that has completed, and the wait-for-any operation is complete. If there is not a representation stored in the ANY container 608, the operation waits until a representation is stored in the ANY container 608, at which point the stored representation is returned and the wait-for-any operation is complete.

In one embodiment, if any of the task objects represented in the task group 602 completes due to failure, information (e.g., exception information) for those task objects are stored in exception container 612, and the representations for the task objects that complete due to failure remain stored in task group 602. After processing the exception information in container 612 for a task object that has completed due to failure, the representation for the task object is then removed from the task group 602.

In one embodiment, task group 602 corresponds to a single processor (or thread) in a multi-processor system, and the single processor is configured to execute all of the task objects identified by the task group 602. In one form of this embodiment, each processor in the multi-processor system has one or more corresponding task groups, and is responsible for executing all of the task objects identified by its corresponding task groups. In another embodiment, task group 602 is shared by multiple processors in a multi-processor system, and each processor is configured to execute a subset of the task objects identified by the task group 602. In one form of this embodiment, the processors are configured to perform a synchronization process to synchronize the addition of task object representations to the task group 602, and the removal of task object representations from the task group 602, such as via a locking mechanism.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-readable storage medium storing computer-executable instructions for performing a method comprising:
   creating a first task group;
   individually adding a plurality of task object representations to the first task group after the first task group has been created, each representation corresponding to one task object in a first plurality of task objects;
   performing a wait operation on the first task group that waits for at least one of the task objects in the first plurality of task objects to complete;
   determining whether a first task object completed due to failure;
   preventing removal of a first one of the representations from the first task group until exception information for the first task object has been processed if it is determined that the first task object completed due to failure; and
   removing the first representation from the first task group after completion of the first task object corresponding to the first representation.

2. The computer-readable storage medium of claim 1, wherein the wait operation waits for all task objects in the first plurality of task objects to complete.

3. The computer-readable storage medium of claim 1, wherein the wait operation waits for any task object in the first plurality of task objects to complete.

4. The computer-readable storage medium of claim 1, wherein the method further comprises:
   creating a second task group; and
   adding the first representation to the second task group.

5. The computer-readable storage medium of claim 4, wherein the method further comprises:
   removing the first representation from the second task group after completion of the first task object.

6. The computer-readable storage medium of claim 1, wherein the first task group is associated with a first processor in a multi-processor system, and wherein the first processor is configured to execute the first plurality of task objects.

7. The computer-readable storage medium of claim 6, wherein the method further comprises:
   creating a second task group associated with a second processor in the multi-processor system.

8. The computer-readable storage medium of claim 7, wherein the method further comprises:
   adding a task object representation for each task object in a second plurality of task objects to the second task group, the second processor configured to execute the second plurality of task objects.

9. The computer-readable storage medium of claim 1, wherein the first task group is associated with a plurality of processors in a multi-processor system, and wherein each of the processors is configured to execute a subset of the first plurality of task objects.

10. The computer-readable storage medium of claim 9, wherein the method further comprises:
    performing a synchronization operation to synchronize addition and removal of task object representations to and from the first task group by the plurality of processors.

11. The computer-readable storage medium of claim 1, wherein the task objects represent asynchronous operations that are configured to be executed in a parallel manner by a plurality of processors.

12. The computer-readable storage medium of claim 1, wherein the task object representations comprise references to task objects.

13. A computer-implemented method for performing a wait operation, the method comprising:
    creating a first task group;
    creating a plurality of task objects;
    individually adding a plurality of task object representations to the first task group after the first task group has been created, each representation corresponding to one of the task objects;
    removing a first one of the representations from the first task group after completion of a first task object corresponding to the first representation;
    performing a wait operation by waiting for at least one of the task object representations to be removed from the first task group, thereby waiting for completion of at least one of the task objects;
    creating a second task group;
    adding the first representation to the second task group; and
    removing the first representation from the second task group after completion of the first task object.

14. The method of claim 13, wherein the task objects represent asynchronous operations that are configured to be executed in a parallel manner by a plurality of processors.

15. The method of claim 13, wherein the wait operation waits for all of the task objects in the plurality of task objects to complete.

16. The method of claim 13, wherein the wait operation waits for any of the task objects in the plurality of task objects to complete.

17. A computer-readable storage medium storing computer-executable instructions for performing a method comprising:

creating a first task group;

individually adding a plurality of task object representations to the first task group after the first task group has been created, each representation corresponding to one task object in a first plurality of task objects, and wherein the first task group is associated with a first processor in a multi-processor system, and wherein the first processor is configured to execute the first plurality of task objects;

removing representations from the first task group based on completion of the task objects;

performing a wait operation based on the removal of representations from the first task group, thereby waiting for completion of at least one of the task objects;

creating a second task group associated with a second processor in the multi-processor system; and adding a task object representation for each task object in a second plurality of task objects to the second task group, the second processor configured to execute the second plurality of task objects.

* * * * *